Sept. 24, 1929.  C. H. TURNER  1,729,301
AUTOMOBILE SIGNAL
Filed April 29, 1929   2 Sheets-Sheet 1

Inventor
Charles H. Turner

By Clarence A. O'Brien
Attorney

Sept. 24, 1929.  C. H. TURNER  1,729,301
AUTOMOBILE SIGNAL
Filed April 29, 1929    2 Sheets-Sheet 2
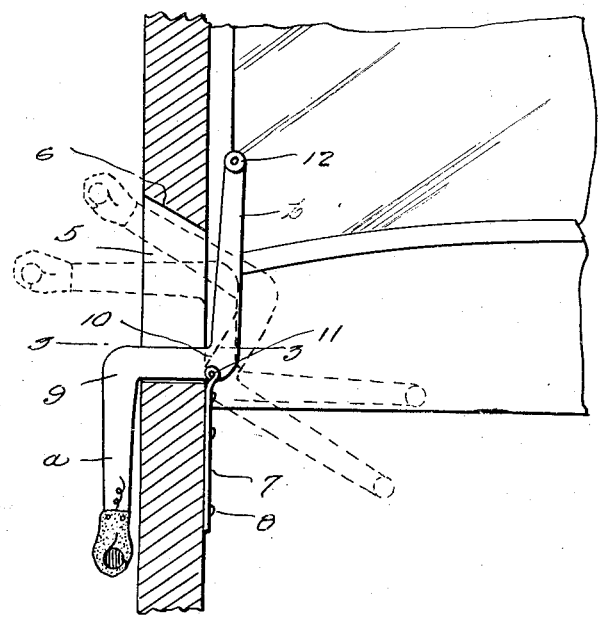
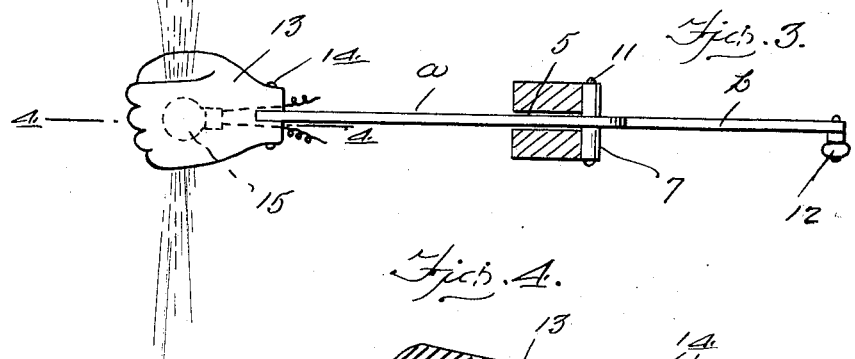
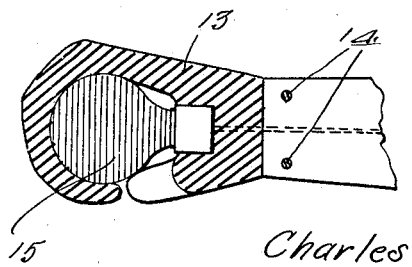
Inventor
Charles H. Turner
By Clarence A. O'Brien
Attorney Patented Sept. 24, 1929

1,729,301

UNITED STATES PATENT OFFICE

CHARLES H. TURNER, OF RANTOUL, KANSAS

AUTOMOBILE SIGNAL

Application filed April 29, 1929. Serial No. 358,952.

This invention relates to an automobile signal and has for its prime object to provide a signalling arm which may be projected from the side of a closed automobile, in simulation of the well known hand signals now commonly used.

Another very important object of the invention resides in the provision of a device of this nature whereby the operating handle of the device will be within easy reach of the driver.

Another very important object of the invention resides in the provision of an illuminated hand for the signalling arm in circuit with the tail light of an automobile.

A still further very important object of the invention resides in the provision of a device of this nature which is simple in its construction, easy to manipulate, inexpensive to manufacture and install, and thoroughly efficient and reliable in use and operation.

With the above and numerous other objects in view as will appear as the description proceeds, the invention resides in certain novel features of construction and in the combination and arrangement of parts as will be hereinafter more fully described and claimed.

In the drawings:

Figure 2 is a fragmentary vertical section taken substantially through the forward portion of an automobile and showing my signalling device associated therewith.

Figure 3 is a sectional view, taken substantially on the line 3—3 of Figure 2.

Figure 4 is a sectional view, taken substantially on the line 4—4 of Figure 3.

Figure 1:
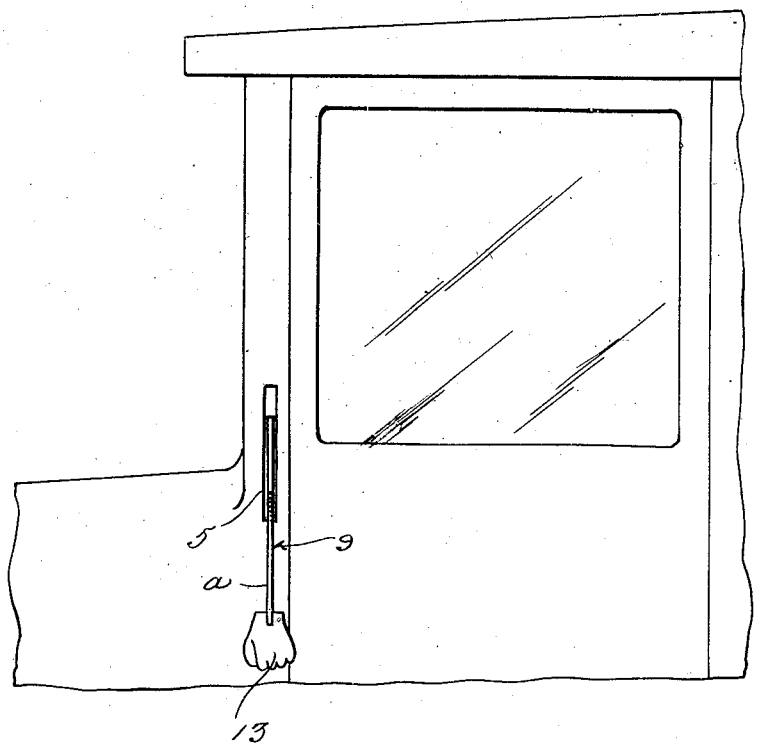
Figure 1 is a fragmentary side elevation of the forward portion of an automobile showing my signalling device associated therewith.
Figure 5:
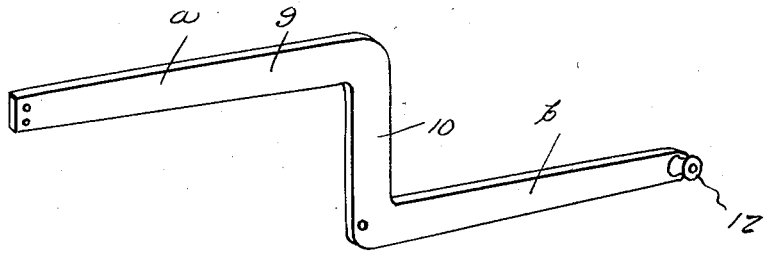
Figure 5 is a perspective view of the signalling arm.
Figure 6:
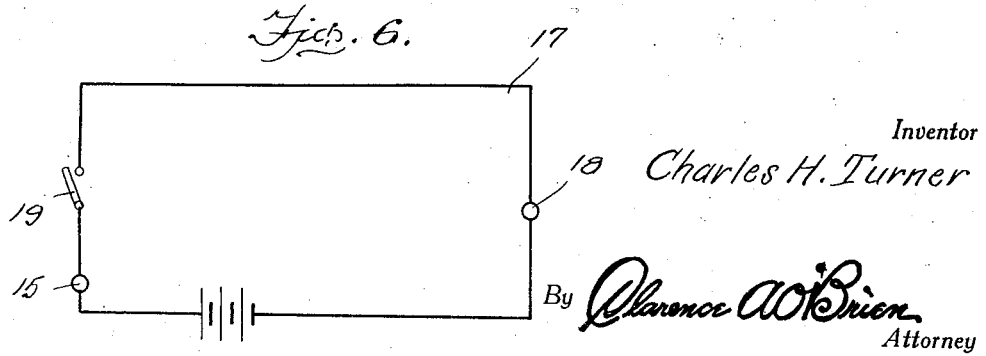
Figure 6 is a diagrammatic view showing the circuit for the illuminating means.

Referring to the drawings in detail, it will be seen that the numeral 5 denotes a vertically elongated stock collar in the forward left hand side of the automobile body in the present exemplification of the invention and the top end of this block is bevelled as indicated at 6, so as to incline downwardly and inwardly.

A bracket 7 is secured to the said side of the automobile body as at 8, adjacent the slot 5. An arm 9 is offset as at 10, intermediate its ends and said offset portion is pivoted as at 11 to the bracket 7.

The outer portion of the arm is designated by the letter $a$ and the inner portion by the letter $b$. The outer portion is preferably wider than the inner portion. A handle 12 is provided on the extremity of the inner portion B. A hand 13 is fixed, as at 14, to the outer end of the arm 9, and this hand is preferably formed of rubber so shaped as to simulate a clutch disc, that is, the hand is so formed as to depict a hand gripping an object within its palm. Disposed within the clinched hand 13 is an electric bulb 15, as shown to advantage in Figure 4 and the said bulb 15 is in a circuit 17, with the tail lights 18 of the automobile, so that when the switch 19 is closed, both the tail light and light 15 are on. The signaling arm normally depends downwardly as indicated in full lines in Figure 2, but the knob or handle 12 is handily situated so that it may be grasped by the operator of the vehicle to swing the inner portion B downwardly, thereby extending the arm to certain signalling position as illustrated in dotted lines in Figure 2.

When the signalling arm is in its normal down position, the tail light will function as a parking light for the automobile.

When the hand is moved from its normal position to extend but a short distance from the car to extend downwardly and away from the car it would of course indicate the intention of the driver to turn to the left; when the arm is raised to extend out from the car as illustrated in dotted lines in Figure 2 of the drawings, the signal arm would then, in accord with the rules of signalling from vehicles, mean "stop"; and when the hand is raised to substantially its highest point, that is to the position shown in dotted lines, illustrating the hand disposed at the upper end of the slot would indicate the intention of the driver to turn to the right.

It is thought that the construction, operation, utility and advantages of this invention will now be quite apparent to those skilled in this art without a more detailed description thereof.

The present embodiment of the invention has been shown merely for the purpose of exemplification, since in actual practice it attains the features of advantage enumerated as described in the statement of the invention and the above description.

It will be apparent that changes in the details of construction and in the combination and arrangement of parts may be resorted to, without departing from the spirit or scope of the invention as hereinafter claimed or sacrificing any of its advantages.

What is claimed is:

1. In combination, a wall having a vertical slot therein, a bracket extending inwardly from the wall, an elongated arm offset intermediate the ends, said offset portion being pivoted to the bracket so that said arm extends through the slots, a hand on the outer end of the arm, an incandescent bulb mounted within the hand, and said hand comprising fingers disposed about the bulb to provide a gripping effect upon the bulb.

2. In combination, a wall having a vertical slot therein, a bracket secured to the wall adjacent said slot, an elongated arm offset intermediate its ends, said offset portion being pivoted to the bracket so that said arm extends through the slot, a hand on the outer end of the arm, said hand preferably being formed of rubber, and said hand having fingers formed thereon cooperating with the palm to receive an incandescent bulb, said outer portion of the arm being broader than the inner portion thereof and a handle at the extremity of the inner portion.

3. In combination, a wall having a vertical slot therein, an elongated arm, means for pivotally mounting said arm for movement within said slot, a hand on the end of the arm, an incandescent bulb mounted within the hand, said hand comprising fingers disposed about the bulb to provide a gripping effect upon the bulb, a handle on the other end of the arm, and said slot being bevelled upwardly and outwardly at its outer end.

In testimony whereof I affix my signature.

CHARLES H. TURNER.